Oct. 9, 1951  L. A. HUGO ET AL  2,570,951
PIPE LINE SCRAPER SIGNALING SYSTEM
Filed Dec. 31, 1948

INVENTORS
A. D. BAKER
L. A. HUGO
BY Hudson and Young
ATTORNEYS

Patented Oct. 9, 1951

2,570,951

UNITED STATES PATENT OFFICE 2,570,951

PIPE-LINE SCRAPER SIGNALING SYSTEM

Lester A. Hugo, Bartlesville, Okla., and Arthur D. Baker, Phillips, Tex., assignors to Phillips Petroleum Company, a corporation of Delaware Application December 31, 1948, Serial No. 68,606

3 Claims. (Cl. 177—311)

This invention relates to a pipe line scraper electrical signaling system, and more specifically it relates to an electrical system for signaling when a pipe line scraper is at or has passed a certain point in a pipe line.

An understanding of the long-felt need of the present invention will be apparent from a description of pipe line scraper operations and the difficulties associated therewith. It is well known that scrapers are passed through crude oil and product pipe lines at certain intervals for the purpose of removing sediment and scale from the internal walls of the pipe. The removal of scale from the walls of the pipe is necessary in order to maintain the capacity of the line at a constant level. If scale is allowed to build up in the line, the capacity of the line is reduced. A typical procedure for scraping a crude oil pipe line is to place a scraper into the line, for example at No. 1 station. After the scraper is placed into the line, the operator at No. 1 station informs the operator at No. 2 station to that effect and that the scraper should reach No. 2 station at a particular time. The time of arrival of the scraper at No. 2 station is, at best, only a guess on the part of the operator at No. 1 station and the time is arrived at by taking into consideration past performance and pumping rates employed at the time. This time interval may vary considerably. Despite the probable time variation, the pump operator at No. 2 station must know the time of arrival of the scraper, because he must know when to shut down the pumps in order to prevent the sediment and scale scraped from the line from passing through the pumps, or if a by-pass valve is to be opened so that the station may be by-passed he must know when to open the valve. By present procedure, the operator of No. 2 station shuts the pumps down shortly before he thinks the scraper will arrive and goes out to the line and listens for the scraper to come along. Consequently, in order to be on the safe side, the pumps are usually down longer than is necessary, which results in a decrease in line capacity for the particular day the scraper is run. It has been the experience of pipe line pump station operators at stations where the scraper is to be run on to No. 3 station, that in many instances the operator of the No. 2 station believes that he has plenty of time to open the by-pass valve before the arrival of the scraper, only to find that the scraper is coming in when the by-pass valve is only partially open; as a result of which the scraper becomes lodged in the by-pass valve and the pipe line has to be shut down to remove the lodged scraper. It has also been their experience, where a scraper trap is used to remove the scraper from the line, to have the operator be of the opinion that the scraper has passed into the trap and that the valve should be closed, only to find that the scraper is coming in when the valve is either partly or completely closed, thereby lodging the scraper in the line necessitating a shutdown of the line. The line scraping procedure employed in product pipe lines is somewhat similar to the procedure used in crude oil lines, except that the pump stations are not usually shut down because of scale and sediment. However, the danger of having the line shut down is increased because, as a rule, at least a pair of scrapers are run through the line, say an hour apart, consequently, it is imperative that the first scraper be removed from the trap or sent by the station before the second scraper arrives. Therefore, the danger of pile up of the scrapers, as well as lodging in a partially opened valve, is present. As a result of these dangers, the operators are wary and the pump stations are either down for longer periods than are really necessary and pumping rates lowered, or the operators spend most of their time looking and listening for the scraper to come in. Even with the extreme precautions that pump station operators take, many scrapers become lodged in a partly opened valve. In view of these difficulties which are encountered in present pipe line scraping operations, it is evident that the present invention provides a solution for a long-standing problem in pipe line operations.

Applicants have discovered a simple and economical electrical signaling system which eliminates the difficulties encountered in present day pipe line scraping operations as discussed above. This signaling system comprises two sets of insulated flanges placed in a pipe line which are separated from each other by a relatively short section of the pipe line which is electrically isolated, a scraper positioned in the pipe line so that it completes a first electrical circuit containing a relay and an auxiliary circuit, the completion of this first circuit actuates the relay which, in turn, causes a second electrical circuit containing a signal to be completed thereby actuating the signal. This signal warns the operator that the scraper has reached or has passed a certain point. The signaling means continues to operate until released by the operator.

An object of this invention is to provide a pipe line scraper signaling device. Another object is to provide a visual and/or audible signaling device to indicate when a pipe line scraper has reached or has passed a certain point in a pipe line. Still another object is to provide a simple and economical method for determining when a scraper reaches or has passed a certain point in a pipe line. Other objects and advantages of this invention will be apparent to one skilled in the art from the accompanying disclosure and discussion.

In the accompanying drawing.

Figure 1:
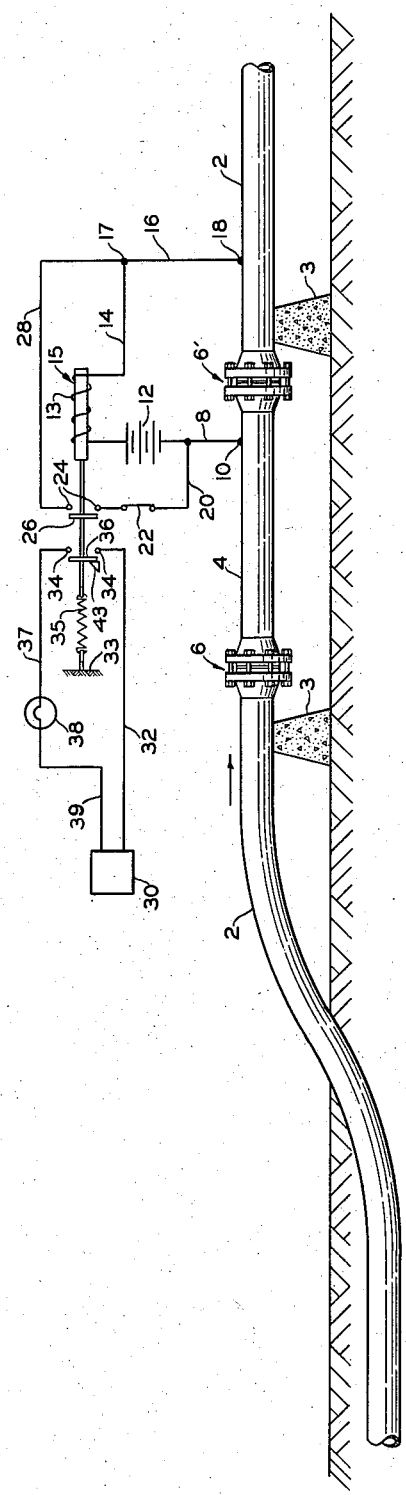
Figure 1 is a diagrammatical view illustrating one form of apparatus embodying this invention.
Figure 2:
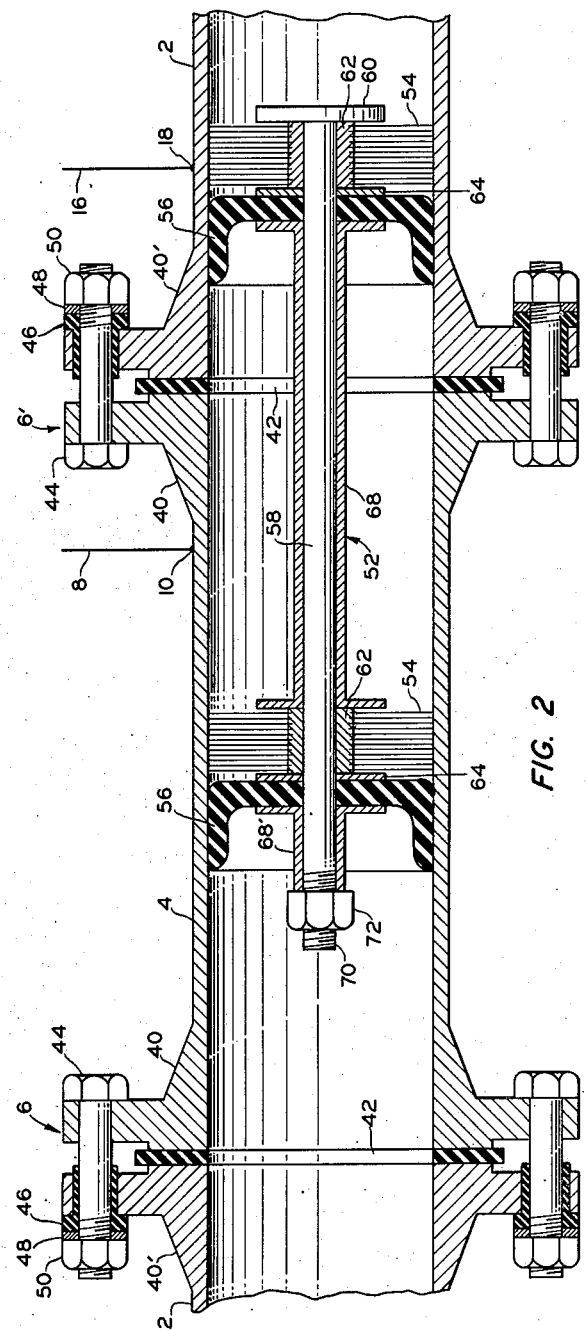
Figure 2 shows a horizontal cross-sectional view of a portion of a pipe line giving in detail two sets of insulated flanges and a horizontal cross-section of a typical scraper positioned in the pipe line so as to complete the electrical circuit.

Figures 1 and 2 of the drawing are for the purpose of illustrating the invention and the invention is not necessarily limited to the embodiments of these figures. The same numerals are used throughout the drawing to indicate the same elements.

Referring to Figure 1 of the drawing, 2 represents a pipe line supported on piers 3 or, if desired, pipe line 2 may be partially or entirely covered by the earth. Pipe line 2 contains section 4 which is electrically isolated therefrom by insulated flanges 6 and 6'. In case section 4 of pipe line 2 contacts the ground, section 4, including flanges 6 and 6', must be electrically isolated from the ground by any suitable insulating material, such as rubber, plastics, or the like. An electrical signaling system containing signaling means is connected to section 4 at point 10 and to pipe line 2 at point 18, and when the circuits in this signaling system are completed the signaling means is energized or actuated. This electrical signaling system comprises a first electric circuit consisting of wire 8, source of power 12, relay 15 (which relay consists of solenoid or coil 13, contacts 26 and 36), wires 14 and 16, and scraper 52 positioned across flange 6', as shown in Figure 2; an auxiliary or holding circuit in the first circuit consisting of wire 20 attached to wire 8 between point 19 and source of power 12, switch 22, contact points 24, contact 26, and wire 28 attached to wires 16 and 14 at point 17; and a second electrical circuit consisting of source of power 30, which may be the same as power 12 if desired, wire 32, contact points 34, contact 36, wire 37, signal 38, which is shown as a light but which may be any visual or audible signal, and wire 39. Spring 35 attached to stationary support 33 is connected to contact 36 and serves to pull contacts 36 and 26 away from contact points 34 and 24, respectively, when the current ceases to flow through coil 13. Stop member 43 controls the distance contacts 36 and 26 are pulled away from contact points 34 and 24 by spring 35.

Referring to Figure 2 of the drawing, scraper 52 and insulated flanges 6 and 6' are shown in detail. Scraper 52, which is only illustrative of the type of scraper that may be used, consists of a shaft 58 which has threads 70 on one end and flange 60 on the other end; wire brushes 54, the periphery of which contacts the internal walls of pipe line 2 and section 4, mounted on metal hubs 62 arranged concentrically around shaft 58; resilient cups 56, the periphery of which contacts the internal walls of the pipe line 2 and section 4 and forms a fluid seal therewith, also arranged concentrically around shaft 58; plates 64, positioned between wire brushes 54 and cups 56; flanged bushings 68 and 68' arranged concentrically around shaft 58 and separating the first resilient cup 56 and the second wire brush 54, and separating the second resilient cup 56 and nut 72, respectively. The entire assembly of the scraper is held in place by tightening nut 72 which thereby engages threads 70 on shaft 58. Still with reference to Figure 2, insulated flanges 6 and 6' each consists of individual flanges 40 and 40', separated from each other by an electrically insulating type gasket 42. Individual flanges 40 and 40' are held tightly together by threaded bolts 44 and nuts 50. Each bolt is electrically isolated from individual flange 40' by an electrically insulating bushing 46 with washer 48 separating each nut 50 from each bushing 46. Therefore, by means of insulating gaskets 42 and insulating bushings 46, section 4 and individual flange 40 are electrically isolated from pipe line 2.

With reference to operation, scraper 52 is forced through pipe line 2 in accordance with well known procedures and in the direction of flow in the line as indicated by the arrow in Figure 1. When the first set of brushes 54 passes insulated flange 6' and reaches pipe line 2, while the second set of brushes 54 remain in insulated section 4, the electrical circuits of the signaling system are completed across flange 6' through the scraper, since scraper 52 is a conductor of electricity. This completion of the circuits causes a signal 38 to be actuated which notifies the operator that scraper 52 has reached or has passed flange 6'. The completion of the electrical circuits, which causes signal 38 to be actuated, is as follows: from source of power 12 a current of electricity flows through coil 13 which is part of relay 15, wires 14 and 16, point 18, wall of pipe line 2, wire brush 54, hub 62, shaft 58, back through the second hub 62, second wire brush 54, wall of section 4, point 10, and wire 8, thereby completing a first circuit. This first circuit being completed, relay 15 becomes actuated and closes contacts 26 and 36 on contact points 24 and 34, respectively, thereby completing the auxiliary circuit through closed switch 22. Relay 15 remains in a closed position until it is released by the operator. The bringing together of contact 36 and contact points 34 completes a second circuit by the flow of current from power source 30 through line 32, contact points 34, contact 36, line 37, signal 38, and line 39, thereby actuating signal means 38. When the operator notices that signal 38 has been actuated he will open switch 22, which is normally in closed position, thereby breaking the auxiliary circuit. If scraper 52 remains positioned across flange 6' whereby the first circuit remains closed, the opening of the auxiliary circuit by means of switch 22 will not have any affect on the position of the relay 15, since coil 13 will be actuated by the first circuit. However, if scraper 52 has passed flange 6' the opening of switch 22 will break the auxiliary circuit and relay 15 will resume the open position shown in Figure 1, consequently, the second circuit will be broken at contact points 34 and 36 thereby shutting off signal 38. It is therefore shown that we have discovered a simple and economical system that fulfills a problem of long standing in pipe line scraping operations.

The primary function of the two sets of insulated flanges is to provide complete electrical isolation of one end of the electrical circuit from the other end, so that the circuit will not be closed except through the action of scraper 52 when in the position shown in Figure 2. Therefore, these two sets of flanges should be sufficiently far apart, for example a distance of from about 10 to about 100 times the diameter of the pipe line in which the flanges are inserted, so that the isolated section of pipe will cooperate with the moving scraper to close the circuit long enough for the mechanism to become actuated, but should not be so far apart as to complicate its isolation from the rest of the pipe line. Reference to having these two sets of flanges "a relatively short distance apart" should be interpreted in the light of the foregoing disclosure and discussion.

While we have disclosed a particular type of circuit, scraper, insulated flanges and the like, it is to be understood that this invention should not be unnecessarily limited to the above drawing and discussion, and that modifications and variations may be made without departing from the invention or from the scope of the claims.

What is claimed is:

1. A pipe line scraper signaling system for signaling when a scraper traveling through a pipe line reaches a certain point in said pipe line, comprising, in combination, a pipe line, a scraper capable of conducting electricity positioned in said pipe line and movable therethrough, two sets of insulated flanges inserted in said pipe line at a relatively short distance apart and separated by a portion of said pipe line which is electrically insulated from the ground and from said pipe line, a first electrical circuit containing a current source, a coil of a relay, and two sections of the pipe line on opposite ends of one set of said insulated flanges, a second electrical circuit operatively connected with the contacts of said relay whereby, when said scraper is in a position in said pipe line such that said first circuit is completed through the scraper across said one set of insulated flanges, the signal contained in said second circuit will be actuated.

2. A pipe line scraper signaling system comprising, in combination, a pipe line, a scraper capable of conducting electricity positioned in said pipe line and movable therethrough, a plurality of insulated flanges inserted in said pipe line at a relatively short distance from each other and separated by a conduit electrically insulated from the ground and from said pipe line, an electric circuit containing a signal means connected to said pipe line and said conduit in a manner so that when said scraper is in a position in said pipe line such that said circuit is completed through said scraper said signal means becomes energized.

3. Apparatus for indicating the progress of a scraper through a pipe line which comprises, in combination, a pipe line having a main section carried in the ground and a second section insulated from the main section and from the ground, an indicator, and a circuit for energizing said indicator, said circuit including a current source, the main section of the pipe line, the insulated section of the pipe line, and an electromagnetic device for actuating said indicator, a scraper positioned in said pipe line so as to complete said circuit between said insulated section and said main section.

LESTER A. HUGO.
ARTHUR D. BAKER.

REFERENCES CITED

The following references are of record in the file of this patent:

UNITED STATES PATENTS

| Number | Name | Date |
|---|---|---|
| 576,425 | Bilton et al. | Feb. 2, 1897 |
| 1,306,154 | Leitman | June 10, 1919 |
| 2,278,939 | Muehter | Apr. 7, 1942 |
| 2,371,251 | Mauldin | Mar. 13, 1945 |